Figure 1:
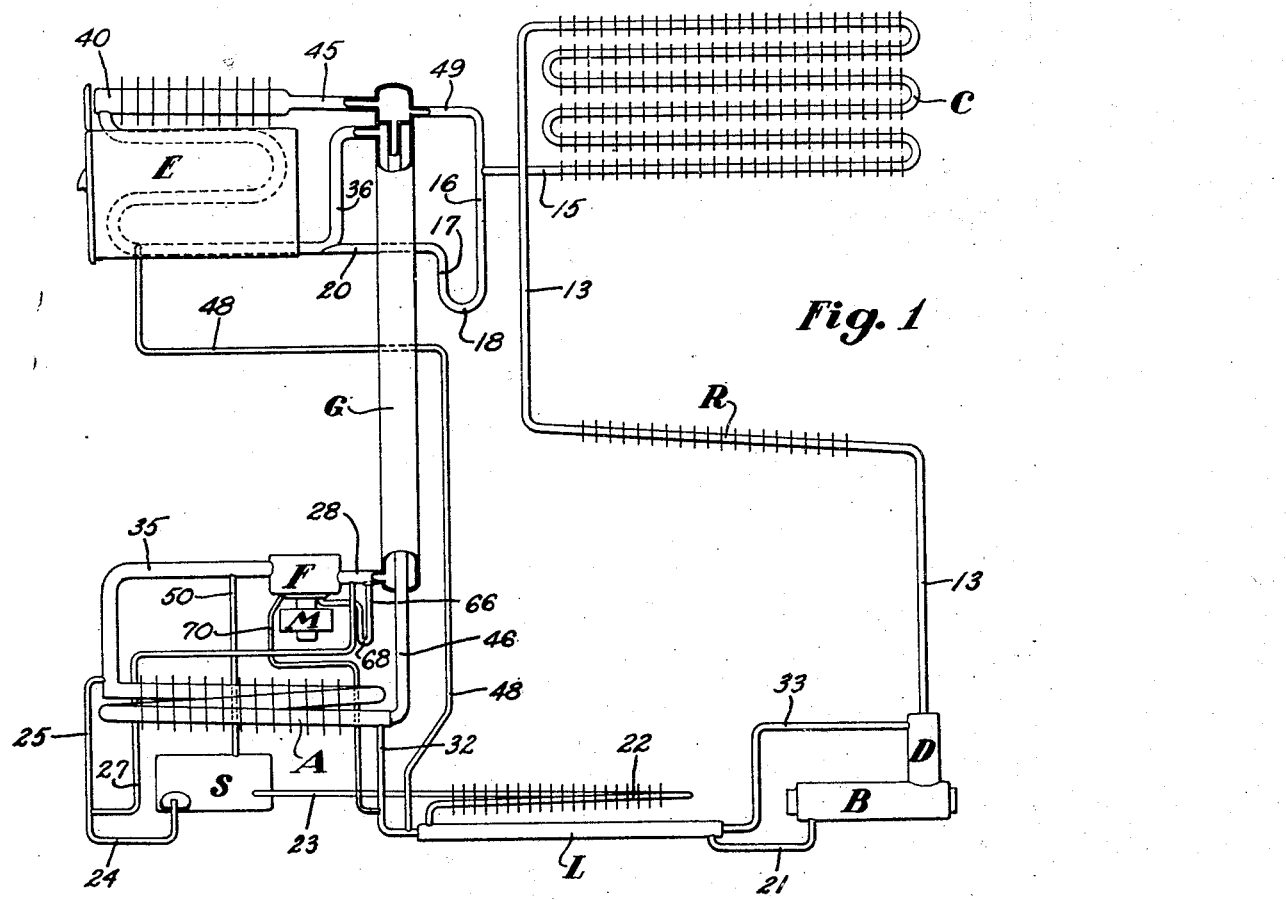

April 27, 1943.  C. C. COONS  2,317,520
REFRIGERATION
Filed Feb. 5, 1940

INVENTOR
Curtis C. Coons
BY
Harry S. Dumarse
ATTORNEYS

Patented Apr. 27, 1943

2,317,520

UNITED STATES PATENT OFFICE 2,317,520

REFRIGERATION

Curtis C. Coons, North Canton, Ohio, assignor to The Hoover Company, North Canton, Ohio Application February 5, 1940, Serial No. 317,387

16 Claims. (Cl. 62—119.5)

This invention relates to refrigeration and more particularly to an absorption refrigerating apparatus of the type using a pressure equalizing medium and having power means for circulating the mediums within the apparatus.

In modern refrigerating apparatus of the type referred to in which a power unit is utilized for circulating the mediums, the moving parts of the power unit are sometimes sealed within the walls of the apparatus. Some means must therefore be provided for lubricating the power unit in such manner that it is not necessary to service the machine during its lifetime.

In absorption refrigerating apparatus using ammonia as the refrigerant, the internal pressures are very high and as a consequence, the walls of the apparatus must be made of high strength steel, usually welded together into an integral structure. From this it can be seen that to service the power unit of such a machine, it would be necessary to return the entire unit to the factory.

It is therefore an object of this invention to provide an absorption refrigerating apparatus, using ammonia as the refrigerant, having the moving parts of the power unit sealed within the integral walls of the apparatus, in which it will be unnecessary to service the power unit for long periods of time.

When a lubricant such as oil comes into contact with a refrigerant such as ammonia, under pressure, some of the ammonia vapor is absorbed in the lubricant and when the pressure is released, this vapor expands, causing the lubricant to boil or foam. When the lubricant boils or foams some of the lubricant will pass off with the escaping ammonia vapor.

In an absorption refrigerating apparatus of the type using ammonia as the refrigerant, water as the absorbent, and a pressure equalizing medium, the total pressures within the system vary considerably between running and idle periods, depending upon the duration of the "on" and "off" periods and the amount of heat supplied to the boiler during the "off" periods. Now, if oil is used as a lubricant, for lubricating the moving parts of the power unit, this variation in pressure will cause some boiling off of the refrigerant vapor from the lubricant and eventually cause the lubricant to be dispersed to other parts of the apparatus.

It is therefore another object of this invention to provide an absorption refrigerating apparatus, of the type using ammonia as a refrigerant and having internal pressure variations between running and idle periods, in which it is not necessary to provide oil as a lubricant for the moving parts of the power unit, but in which the power unit is lubricated by a liquid medium normally contained in the apparatus.

Ammonia is readily soluble in water, can be readily separated therefrom by the application of heat and has a high heat of vaporization. It is therefore an excellent substance for use as the refrigerant in absorption refrigerating machines. It has, however, the disadvantage that it attacks iron or steel of which such machines are usually made. A corrosion inhibitor is therefore desirable to protect the metal of the boiler and solution circuit from attack by the ammonia. This inhibitor should be readily soluble in the absorbent and non-distillable so that it will not be boiled off with the refrigerant when the boiler is heated so as to interfere with the operation of the machine.

One such inhibitor is sodium chromate which reacts with iron to form a coating on the surface of the iron which is resistant to the corrosive action of ammonia. It has the disadvantage, however, that it attacks some other metals.

Aluminum is a good electrical conductor and is also resistant to attack by ammonia; it is therefore a good material for the conductor bars and end rings of an induction motor but is very susceptible to attack by sodium chromate. Some bearing materials, suitable for use in an ammonia atmosphere are also very susceptible to attack by sodium chromate.

It is therefore another object of this invention to provide an absorption refrigerating apparatus having a power unit for circulating the mediums, which is protected from coming into contact with the inhibitor dissolved in the absorbent.

If the power unit of an absorption refrigerating machine containing materials which are subject to attack by the sodium chromate which is dissolved in the absorbent, is lubricated by liquid mediums normally contained within the machine, it is necessary that the liquid medium for lubricating the power unit be collected from some part of the apparatus in which the liquid medium is condensed from a vaporous state since the inhibitor cannot be separated from the absorbent in the boiler by the application of heat.

It is therefore another object of this invention to lubricate the power unit of an absorption refrigerating machine with a liquid medium normally contained within the machine and to collect this liquid medium from some portion of the machine in which the liquid medium is condensed from a vaporous state so as to prevent the corrosion inhibitor which is dissolved in the absorbent from coming into contact with the power unit.

In absorption refrigerating apparatus of the type using a pressure equalizing medium, the internal pressure is substantially the same throughout all parts of the apparatus. It is therefore possible to circulate the mediums in the apparatus with a very small power unit. It has been found that fractional horsepower induction motors are suitable for this purpose. It has also been found that the motor rotor should be entirely submerged in a liquid since the action of the liquid will automatically center the rotor in its casing. This has the advantage that the motor is quieter running and the rotor bearing tolerances need not be maintained to such close limits.

It is therefore another object of this invention to provide a small power unit for circulating the mediums in an absorption refrigerating apparatus in which the rotor of the power unit is entirely submerged in a liquid medium normally contained in the apparatus.

Figure 2:
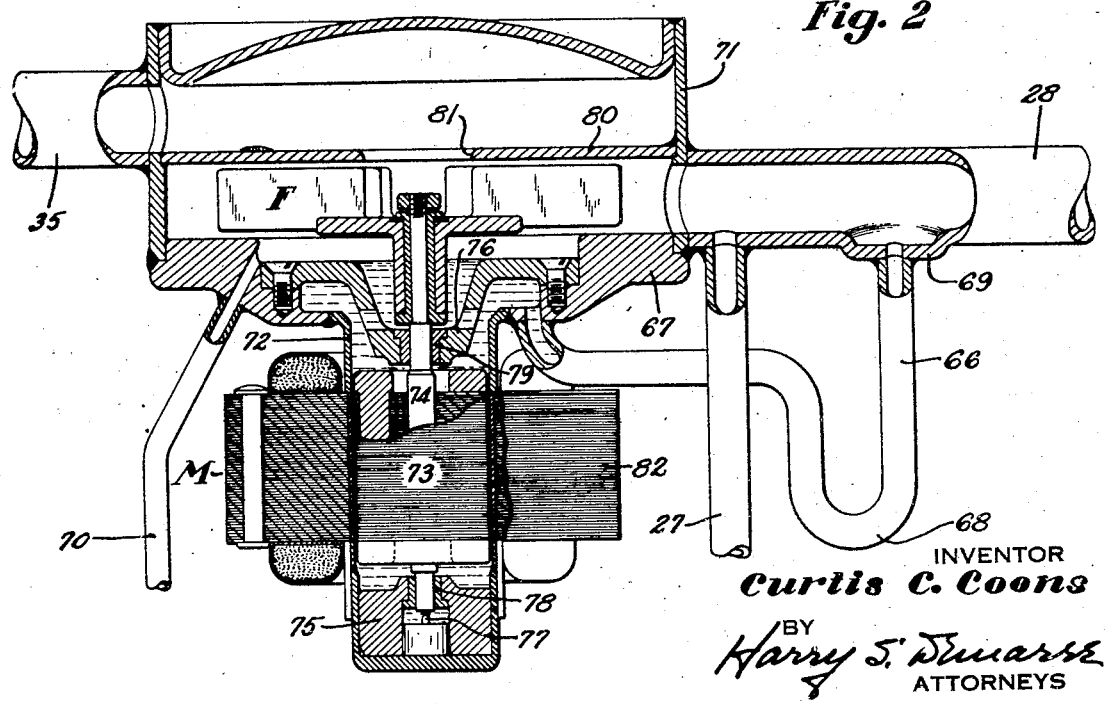

Other objects and advantages of this invention will become apparent as the description proceeds when taken in connection with the accompanying drawing in which:

Figure 1 is a diagrammatic view of an absorption refrigerating apparatus embodying the principles of this invention, and Figure 2 is a longitudinal sectional view of the power unit, according to this invention, depicting how the rotor of the power unit is submerged in the liquid medium.

Referring to Figure 1 of the drawing, there is disclosed a three fluid absorption refrigerating system comprising a boiler B, an analyzer D, an air cooled rectifier R, a tubular air-cooled condenser C, an evaporator E, a gas heat exchanger G, a tubular air-cooled absorber A, a solution reservoir S, a liquid heat exchanger L, and a circulating fan F which is driven by an electric motor M.

The above described elements are interconnected by various conduits to form a plurality of gas and liquid circuits constituting a complete refrigerating system to which reference will be made in more detail hereinafter.

The refrigerating system will be charged with a suitable refrigerant, such as ammonia, a suitable absorbent, such as water with a corrosion inhibitor such as sodium chromate dissolved therein, and a suitable pressure equalizing medium such as hydrogen or nitrogen.

The application of heat to the boiler B liberates refrigerant vapor from the strong solution contained therein. The vapor so liberated passes upwardly through the analyzer D in counterflow relationship to strong solution flowing downwardly through the analyzer. Further refrigerant vapor is generated in the analyzer by the heat of condensation of absorption solution vapor generated in the boiler. The refrigerant vapor is conducted from the upper portion of the analyzer D to the upper portion of the condenser C through a conduit 13 which includes the air cooled rectifier R wherein any vapor of absorption solution passing through the analyzer is condensed and returned to the analyzer through the conduit 13.

The refrigerant vapor is liquefied in the condenser by heat exchange relation with atmospheric air and is discharged from the bottom portion thereof through a conduit 15 into a downwardly extending conduit 16. The bottom portion of the conduit 16 connects to the bottom portion of an upwardly extending conduit 17 through a U-bend 18. The conduit 16 is appreciably longer than the conduit 17 for a purpose to be described later. The conduit 17 opens at its upper end into a conduit 20 which discharges into the evaporator in a manner to be described more fully hereinafter.

The weak solution formed in the boiler by the generation of refrigerant vapor therefrom is conveyed from the boiler through a conduit 21, the outer pass of liquid heat exchanger L, through a pre-cooler 22 and a conduit 23 into the solution reservoir S. The weak solution is conveyed from the solution reservoir S through a U-shaped conduit 24 opening into an upwardly extending tube 25 of small diameter, forming a gas lift pump which discharges into the top of the absorber A. It is apparent that the top of the absorber is materially above the solution level normally prevailing in the boiler-analyzer-reservoir system wherefor some means must be provided to elevate the absorption solution to the top of the absorber A. For this purpose a small bleed conduit 27 is connected to the discharge conduit 28 of the circulating fan F and leads to the junction of the conduits 24 and 25 which is below the solution level normally prevailing in the reservoir whereby the weak solution is elevated to the top of the absorber by gas lift action.

In the absorber, the weak solution flows downwardly by gravity in counterflow to the rich pressure equalizing medium refrigerant vapor mixture flowing upwardly therethrough. The refrigerant vapor content of the mixture is absorbed in the absorption solution and the heat of absorption is rejected to the surrounding air by air cooling fins which are mounted on the exterior walls of the absorber vessel. The strong solution formed in the absorber discharges into conduit 32 which opens into the inner pass of the liquid heat exchanger L. From the inner pass of the liquid heat exchanger L, the strong solution is conveyed to the upper portion of the analyzer D by conduit 33 whereby it flows downwardly through the analyzer in counterflow to the rising vapors generated in the boiler.

The weak pressure equalizing medium refrigerant vapor mixture present in absorber A is taken from the upper portion thereof through the conduit 35 into the suction side of the circulating fan F in which it is placed under pressure and discharged through conduit 28 into the outer pass of the gas heat exchanger G and therefrom through a downwardly extending conduit 36 into the bottom of the evaporator E.

The conduit 20 opens into the bottom portion of the conduit 36 whereby the liquid refrigerant supplied to the evaporator enters simultaneously with the pressure equalizing medium which is placed under pressure by the circulating fan F. The diameter of the conduit of the evaporator is relatively small whereby the pressure equalizing medium flows through it at a relatively high velocity. The rapidly flowing pressure equalizing medium sweeps or drags the liquid refrigerant with it through the evaporator into the box cooling conduit 40 as the refrigerant is evaporated by diffusion into the pressure equalizing medium to produce refrigeration. In the conduit 40 the velocity of the inert gas stream is relatively slow by reason of the large diameter of that conduit and the liquid refrigerant flows therethrough by gravity. Any liquid refrigerant not evaporated in the evaporator will flow through conduit 45, the inner pass of the gas heat exchanger G and pass by conduit 46 to the bottom of the absorber.

The rich pressure equalizing medium refrigerant vapor mixture formed in the evaporator is conducted therefrom into the inner pass of the gas heat exchanger G through a conduit 45. The opposite end of the gas heat exchanger G communicates with the bottom portion of absorber A through a conduit 46. In the absorber A the rich pressure equalizing medium refrigerant vapor mixture flows upwardly in counterflow to absorption solution whereby the refrigerant vapor content of the mixture is absorbed by the weak solution.

The bottom coil of evaporator E is provided with a drain conduit 48 which opens into the strong solution discharge conduit 32. The conduit 48 opens into the top portion of the bottom coil of the evaporator whereby it will not completely drain such conduit. The upper portion of discharge conduit 15 of the condenser is vented through a vent conduit 49 into the inner pass of the gas heat exchanger G. The solution reservoir is vented through a conduit 50 into the suction conduit 35 of the circulating fan.

The circulating fan F places the pressure equalizing medium discharged therefrom under a small pressure in the neighborhood of a pressure of a few inches of water over that prevailing at the suction side of the fan. In order to prevent this pressure, which also prevails in the conduit 36, from being carried back through the condenser discharge conduit, the condenser and conduit 13 to the analyzer, the conduit 16 is made appreciably longer than the conduit 17 whereby a pressure balancing column of liquid is formed in the conduit 16 which extends above the point of connection between the conduits 17 and 20 a distance sufficient to overcome the pressure produced by the circulating fan in the conduit 36.

Leading from the fan discharge conduit 28 adjacent the bottom of the outer pass of the gas heat exchanger G is a conduit 66 which opens to the interior of the bottom plate 67 of the fan casing as clearly shown in Figure 2. The conduit 66 has a U-bend portion 68 for a purpose which will be described later. The conduit 28 has a downwardly extending bulge 69 where the conduit 66 is attached thereto.

A conduit 70 leads from the bottom plate 67 of the fan casing to the strong solution return conduit 32.

Referring to Figure 2 the motor fan unit comprises a casing 71 for the fan and a shell 72 separating the motor rotor 73 from the motor field structure 82. The portion of the shell 72 between the rotor and field structure is made very thin to reduce the effective air gap between the rotor and stator and is supported against internal pressure by the field structure 82 being pressed tightly thereover. The rotor 73 is rigidly connected to the fan F by shaft 74 which is rotatably supported on the interior of the casing by bearing assemblies 75 and 76.

The lower bearing assembly 75 includes a two-part thrust bearing 77 of very hard material such as tungsten carbide and a large clearance babbitt radial bearing 78. The top bearing assembly 76 also includes a large clearance babbitt radial bearing 79. The shaft 74 is preferably made of stainless steel.

The fan casing is divided into a suction chamber and a high pressure chamber by plate 80 having an aperture 81 leading to the suction side of the fan.

During operation all of the refrigerant vapor is not removed from the inert gas in the absorber A so that the gaseous medium leaving the absorber is a lean mixture of the refrigerant vapor and the inert medium which leaves the absorber in a comparatively warm state. When this warm mixture comes into heat exchange relationship with the cold inert medium refrigerant vapor mixture returning to the absorber from the evaporator, it becomes cold and a small amount will be condensed out and will flow to the bottom of the outer pass of the gas heat exchanger G and into the pocket 69 of the tube 28. It will then flow through the tube 66 into the interior of the motor fan casing and will eventually completely submerge the rotor 73 to the level shown in Figure 2. Any excess liquid will drain through conduit 70 back to the solution circuit.

The pressure in the conduit 28 being that of the high pressure side of the fan and the pressure within the shell 72 being a somewhat lower pressure, the liquid level in the right-hand leg of the U-member 68 will be lower than the level within the motor fan casing by an amount sufficient to balance this difference in pressure.

The sodium chromate corrosion inhibitor which is dissolved in the absorbent has the property of forming a stainless steel coating on the steel tubing of the boiler absorber circuit. It has, however, the disadvantage that it would attack the aluminum conductor bars and end rings and bearings of the motor fan unit. Since this chromate inhibitor will not distill off in the boiler it can never reach the motor to attack the conductor bars and end thereof, but at the same time the rotor is completely submerged in a medium normally contained in the apparatus so that no additional lubrication is necessary.

By submerging the rotor 73 in a liquid medium the rotor centers itself as it reaches its operating speed. This is due to the fact that if the rotor is off center at the beginning of its operation, the liquid will tend to rotate with the rotor and be drawn between the rotor 73 and the shell 72 at the point where the rotor is closest to the shell and move it away from the shell at that point. This action will continue until the rotor is completely centralized. It is to be noted that the space between the rotor and shell when the rotor is centered is very small and may be only a few thousandths of an inch.

The fact that the action of the lubricant automatically centers the rotor, renders it possible to make the radial babbitt bearings 78 and 79 with a much larger clearance between their bearing surfaces and that of the shaft 74 than would otherwise be possible. Thus the bearing surfaces are only in contact when the rotor is starting and the wear thereon will be negligible.

The buoyant effect of the liquid medium will also lighten the load on the thrust bearing 77 and thereby reduce the wear thereon. Since the radial bearings are out of contact with the shaft during operation a much quieter motor will result.

If desired the conduit 66 should be connected to the inner pass of the gas heat exchanger so as to collect any liquid refrigerant not evaporated in the evaporator E and the same result would be produced.

It can be seen from the foregoing that this invention provides a three fluid absorption refrigerating machine with a power unit for circulating the mediums in which no lubricant is provided other than a liquid medium normally contained within the apparatus and in which this liquid medium is taken from a part of the apparatus free of a corrosion inhibitor which is deleterious to the moving parts of such power unit.

This invention also provides an absorption refrigerating apparatus having a power unit sealed within the walls of the apparatus in which the rotor of the power unit is submerged in a liquid medium normally contained in the apparatus whereby no additional lubricant is necessary and the rotor is automatically centralized during operation, making frequent servicing unnecessary.

While I have shown but a single embodiment of my invention it is to be understood that this embodiment is to be taken as illustrative only and not in a limiting sense. I do not wish to be limited to the specific structure shown and described, but to include all equivalent variations thereof except as limited by the claims.

I claim:

1. An absorption refrigerating apparatus comprising circuits for liquid and gaseous mediums, power means for circulating said mediums, said apparatus being charged with a refrigerant, a pressure equalizing medium, an absorption solution and a non-distillable corrosion inhibitor dissolved in the absorption solution, said power means being so positioned in said circuits that distillate collects therein for lubricating said power means.

2. An absorption refrigerating apparatus comprising a boiler, an absorber and an evaporator, conduits connecting the boiler and absorber to form a circuit therebetween, conduits connecting the evaporator and absorber to form a circuit therebetween, said apparatus being charged with a refrigerant, an inert medium, an absorption solution and a non-distillable corrosion inhibitor dissolved in the absorption solution, a motor fan unit for circulating the inert medium in its circuit, said motor fan unit comprising a vertically extending casing having an upper portion for housing the fan and a lower portion for housing the motor rotor and being so constructed and positioned in said circuit that distillate collects in the lower portion of the housing and the motor rotor is submerged in a liquid medium free of the corrosion inhibitor.

3. An absorption refrigerating apparatus comprising an absorber, an evaporator and a boiler, conduits connecting the boiler and absorber to form a circuit therebetween, conduits connecting the evaporator and absorber to form a circuit therebetween, said apparatus being charged with a refrigerant, an inert medium, an absorption solution and a non-distillable corrosion inhibitor dissolved in the absorption solution, a motor fan unit for circulating the inert medium in its circuit, said motor fan unit comprising a vertically extending casing having an upper portion for housing the fan and a lower portion for housing the motor rotor and being so positioned in said circuit that distillate collects in the lower portion of the housing, and a drain for the upper portion of the housing for maintaining the fan free of distillate.

4. An absorption refrigerating apparatus comprising a boiler, an absorber and an evaporator, conduits connecting the boiler and absorber to form a circuit therebetween, conduits connecting the evaporator and absorber to form a circuit therebetween, said apparatus being charged with a refrigerant, an inert medium and an absorption solution, a motor fan unit for circulating the mediums in said circuits, said motor fan unit comprising a vertically extending casing having an upper portion for housing the fan and a lower portion for housing the motor rotor, and being so constructed and positioned in said circuit that liquid mediums collect in the lower portion of the housing and the motor rotor is submerged in a liquid medium with which the system is charged.

5. An absorption refrigerating apparatus comprising a boiler, an absorber and an evaporator, conduits connecting the boiler and absorber to form a circuit therebetween, conduits connecting the evaporator and absorber to form a circuit therebetween, said apparatus being charged with a refrigerant, an inert medium and an absorption solution, a motor fan unit for circulating the mediums in said circuits, said motor fan unit comprising a vertically extending casing having an upper portion for housing the fan and a lower portion for housing the motor rotor, and being so positioned in said circuit that liquid mediums collect in the lower portion of the housing and a drain for the upper portion of the housing for maintaining the fan free of liquid medium.

6. An absorption refrigerating apparatus comprising a boiler, a condenser, an evaporator and an absorber, conduits connecting the boiler and absorber to form a solution circuit therebetween, conduits including a heat exchanger connecting the evaporator and absorber to form a gas circuit therebetween, power means positioned in said gas circuit for circulating the gas in its circuit, a conduit for leading gas placed under pressure by said power operated means to the solution circuit and being so arranged relative thereto as to circulate the solution in its circuit, a conduit leading from the condenser to the evaporator to supply condensed refrigerant thereto, and being so constructed and positioned relative to the gas circuit that the pressure developed by the power operated means propels condensate through the evaporator, said power operated means being positioned in that part of the gas circuit leading from the absorber to the evaporator so that condensate collecting in the heat exchanger may be utilized to lubricate said power means.

7. An absorption refrigerating apparatus comprising a condenser, an evaporator and an absorber, conduits including a heat-exchanger connecting the evaporator and absorber to form a gas circuit therebetween, power means positioned in said gas circuit for circulating the gas in its circuit, a conduit leading from the condenser to the evaporator to supply condensed refrigerant thereto and being so constructed and positioned relative to the gas circuit that the pressure developed by the power means circulates condensed refrigerant through the evaporator, said power means being so positioned in that part of the gas circuit leading from the absorber to the evaporator whereby condensate collecting in the heat-exchanger may be utilized to lubricate said power means.

8. An absorption refrigerating apparatus comprising a condenser, an evaporator and an absorber, conduits including a heat-exchanger connecting the evaporator and absorber forming a circuit therebetween, said apparatus being charged with a refrigerant, an inert pressure equalizing medium, an absorption solution and a non-distillable corrosion inhibitor dissolved in the absorption solution, a power unit positioned in said circuit for circulating the inert medium in its circuit, a conduit leading from the condenser to the evaporator to supply condensed refrigerant thereto and being so constructed and positioned relative to the gas circuit that the pressure developed by the power unit circulates condensate along the evaporator, said power unit being so positioned in that part of the gas circuit leading from the absorber to the evaporator as to collect condensate therefrom whereby condensate collecting in the heat exchanger may be utilized to lubricate the power unit and the power unit is lubricated by a liquid medium free of the corrosion inhibitor.

9. An absorption refrigerating apparatus comprising, an evaporator and an absorber, conduits connecting said evaporator and absorber to form an inert gas circuit, a portion of said conduits forming a gas heat exchanger, power means in said circuit for circulating the inert medium in its circuit, said power means being so arranged relative to the gas heat exchanger that liquid condensed in said heat exchanger drains to said power means.

10. An absorption refrigerating apparatus comprising, an evaporator and an absorber, conduits connecting said evaporator and absorber to form a circuit therebetween, a portion of said conduits forming a gas heat exchanger, said apparatus being charged with a refrigerant, an absorbent, an inert gas and a non-distillable corrosion inhibitor, power means in said circuit for circulating the solution and inert gas and being so arranged relative to said heat exchanger as to collect liquid condensed therein for the purpose of lubricating the power means and whereby the corrosion inhibitor cannot contact said power means.

11. The method of operating an absorption refrigerating apparatus of the type having power means on the interior of the apparatus for circulating the mediums in the apparatus and being charged with a refrigerant, an absorbent and a non-distillable corrosion inhibitor dissolved in absorbent comprising, heating the liquid medium therein, cooling a vapor containing portion of the apparatus to form a distillate, collecting distillate formed thereby and conducting the distillate to the power means so as to lubricate the same whereby the inhibitor cannot come into contact with the power means.

12. The method of operating a refrigerating apparatus of the type having power means in a closed inert medium-refrigerant vapor mixture circuit including a gas heat exchanger between the evaporator and absorber and being charged with a refrigerant, an inert medium, and an absorbent having a non-distillable corrosion inhibitor dissolved therein comprising, distilling refrigerant from the absorbent containing the inhibitor, circulating the inert medium-refrigerant vapor mixture from the absorber through the heat exchanger to the evaporator and back to the absorber through the heat exchanger whereby the cold mixture returning to the absorber will condense distillate from the warm mixture going to the evaporator, collecting the condensed distillate and conducting the condensed distillate to the power means so as to lubricate the same.

13. The method of lubricating the power unit of a refrigerating apparatus of the type in which an inert gas refrigerant vapor mixture is circulated from the absorber through a heat exchanger to the evaporator and back to the absorber through the heat exchanger and being charged with an absorbent having a non-distillable substance dissolved therein which has a deleterious effect on the power means comprising, the step of conducting the condensed distillate which condenses from the warm inert gas refrigerant vapor mixture going from the absorber to the evaporator by reason of being cooled by the mixture returning to the absorber, to the power unit so as to lubricate the same.

14. An absorption refrigerating apparatus comprising, circuits for liquid and gaseous mediums, and a power unit for circulating said mediums, said apparatus being charged with a refrigerant and an absorbent having a non-distillable substance dissolved therein which is deleterious to the power unit, said power unit being so constructed and positioned in said circuits that non-distilled solution will not contact therewith and that the distillate will be collected to lubricate the power unit.

15. An absorption refrigerating apparatus comprising a boiler, an absorber and an evaporator, conduits connecting the boiler and absorber to form a circuit therebetween, conduits connecting the evaporator and absorber to form a circuit therebetween, said apparatus being charged with a refrigerant, an inert medium and an absorption solution, a motor fan unit for circulating the mediums in said circuits, said motor fan unit comprising a vertically extending casing for housing a motor fan rotor with the fan facing upwardly, said rotor being rotatably supported by a thrust bearing, means in the casing for positioning said rotor in a generally central position, but permitting appreciable radial movement, said casing being so positioned in said circuits that a liquid medium collects in the lower portion of the housing whereby the motor rotor may be submerged in a liquid medium with which the system is charged, and the rotor may be lubricated and centered by the liquid medium during rotation.

16. In the art of operating an absorption refrigerating apparatus of the type having a plurality of working mediums and a non-distillable corrosion inhibitor therein and power means on the interior thereof for circulating at least one of the working mediums, that process which comprises the step of lubricating the power means with a distillate formed in the apparatus while remaining in the apparatus.

CURTIS C. COONS.